United States Patent [19]

Bernales et al.

[11] 4,171,348

[45] Oct. 16, 1979

[54] PROCESS FOR ELIMINATING CARBON DEPOSITION ON SULFUR DIOXIDE REDUCTION CATALYST IN A STAGED REACTOR SYSTEM

[75] Inventors: Cicero A. Bernales, Liverpool, N.Y.; Aubrey W. Michener, Morristown, N.J.

[73] Assignee: Allied Chemical Corporation, Morristown, N.J.

[21] Appl. No.: 920,749

[22] Filed: Jun. 29, 1978

[51] Int. Cl.[2] .......... C01B 17/04

[52] U.S. Cl. .......... 423/570; 423/564

[58] Field of Search .......... 423/569, 570, 564, 576

[56] References Cited

U.S. PATENT DOCUMENTS

| | | | |
|---|---|---|---|
| 1,440,286 | 12/1922 | Forwood | 423/564 X |
| 3,199,955 | 8/1965 | West et al. | 423/570 |
| 3,928,547 | 12/1975 | Daley et al. | 423/570 |
| 4,039,650 | 8/1977 | Daley | 423/576 X |

FOREIGN PATENT DOCUMENTS

| | | | |
|---|---|---|---|
| 919391 | 1/1973 | Canada | 423/570 |
| 955730 | 10/1974 | Canada | 423/570 |
| 943737 | 12/1963 | United Kingdom | 423/564 |

*Primary Examiner*—G. O. Peters

*Attorney, Agent, or Firm*—Michael S. Jarosz; Anthony J. Stewart

[57] ABSTRACT

This invention relates to a process for the prevention of carbonaceous deposits from forming on the surfaces of catalytic materials employed in the reduction of sulfur dioxide in a gas stream with a gaseous reductant to produce elemental sulfur by a process consisting essentially of preheating separately the sulfur dioxide gas stream to a temperature above the initiation temperature of the reduction reaction and the gaseous reductant stream to a temperature below the initiation temperature of the reduction reaction, preferably mixed with elemental sulfur vapor, rapidly mixing the two preheated streams just prior to their introduction into a reaction zone, passing the resulting mixture through the reaction zone under reaction conditions, including an initiation temperature, sufficient to effect reaction of said gaseous reductant with the sulfur dioxide and recovering a product stream containing elemental sulfur.

15 Claims, No Drawings

PROCESS FOR ELIMINATING CARBON DEPOSITION ON SULFUR DIOXIDE REDUCTION CATALYST IN A STAGED REACTOR SYSTEM

BACKGROUND OF THE INVENTION

Sulfur dioxide ($SO_2$) is found in gases vented from industrial plants involved in roasting, smelting and sintering sulfide ores, such as chalcopyrite ($CuFeS_2$), iron pyrites ($FeS_2$) or pyrrhotite ($Fe_7S_8$), or gases from power plants burning sulfur-bearing coal or in exit gases from other industrial operations involved in the combustion of sulfur-bearing fuels, such as fuel oil. Air pollution as the result of $SO_2$ emissions from these gases represents not only a health hazard by contaminating the surrounding atmosphere, but results in a loss of valuable sulfur values. Therefore, it is desirable to recover $SO_2$ from such gases preferably in the form of elemental sulfur in order to control $SO_2$ emissions economically.

The reduction of sulfur dioxide to elemental sulfur has been investigated extensively over a period of many years and there have been published a myriad of references on this subject. For instance, typical of such disclosures include U.S. Pat. Nos. 3,199,955; 3,927,191; 3,928,547 and 4,039,650 and the references disclosed therein and cited during the prosecution of the patent applications which matured into these patents. U.S. Pat. No. 3,199,955 discloses a variety of processing and equipment schemes for the reduction of $SO_2$ with a hydrocarbon reductant. This patent teaches that the reactants should be preheated to a temperature sufficient to initiate and maintain the reduction reaction. U.S. Pat. No. 3,927,191 discloses a three stage reaction system wherein the sulfur dioxide is introduced into the system in two of the three reactor stages in certain ratios to reduce the heat of reaction and permit higher gas space velocities. U.S. Pat. No. 3,928,547 discloses the use of elemental sulfur vapors during the initiation of the reduction of gaseous sulfur dioxide with a gaseous hydrocarbon reducing agent at elevated temperatures. In U.S. Pat. No. 4,039,650 there is disclosed another process wherein a staged reactor system is employed for the reduction of sulfur dioxide to elemental sulfur. In U.S. Pat. Nos. 3,928,547 and 4,039,650 it is disclosed that the presence of elemental sulfur vapors during the initiation of the reduction reaction permits the use of lower temperatures to initiate the reduction of sulfur dioxide with a hydrocarbon reducing agent, such as methane, than previously disclosed. Also, the presence of this elemental sulfur vapor has a moderating effect on the temperature rise during the reduction reaction.

As a result of the shortage of methane, particularly natural gas which contains a high proportion of methane, alternate reductants have been investigated for use in commercial installations for the reduction of sulfur dioxide to sulfur. However, when higher hydrocarbons were employed as the reductant, it has been observed that carbonaceous deposits form on the catalyst surfaces and that it is necessary to operate at higher operating temperatures than usual to avoid carbon deposition within the reactor. Such higher temperatures adversely affect the catalyst life. For instance, when using the same reactor system as in U.S. Pat. Nos. 3,928,547 and 4,039,650, it has been found that when butane is used as the hydrocarbon reductant, initiation temperatures of at least 1700° F. are necessary to obviate carbon deposits on the catalyst surfaces.

It has previously been reported, U.S. Pat. No. 3,892,677, that in a process for regenerating sulfur oxide acceptors, such as copper or copper oxide; wherein the material has been converted to copper sulfate during the acceptance reaction, the the sulfate may be subsequently decomposed by reacting it with a reducing gas, such as a hydrocarbon reducing gas, to regenerate the acceptor and obtain a gas considerably richer in sulfur dioxide than the flue gas from which it was removed. During this regeneration with a hydrocarbon reducing agent, it is reported that combustible material is deposited on the acceptor and that the higher the molecular weight of the hydrocarbon regenerating gas the greater the amount of combustible material deposited on the acceptor surfaces. Relatively large quantities of combustible material are reported to be deposited when saturated hydrocarbons of more than 4 carbon atoms per molecule are used as the regenerating gas and by burning these large quantities of combustible material at a high temperature the acceptor's life is reduced. The patentee reports obviating or reducing the quantity of combustible material deposited during regeneration by treating the acceptor with a reducing gas comprising a mixture of a hydrocarbon and an inert diluent, such as steam, carbon dioxide and nitrogen.

Also, natural gas which is a mixture comprising various concentrations of methane, ethane, propane, the butanes, the pentanes, the hexanes, the heptanes, the octanes, nitrogen and carbon dioxide, has been found to form carbonaceous deposits on catalyst surfaces when it contains in excess of certain concentrations of the higher molecular weight hydrocarbons. For instance, a natural gas composition which contains more than about 10 mol percent propane, or more than about 7 mol percent butane, or more than about 0.25 mol percent pentane, hexane, heptane or octane has been found to form carbonaceous deposits on the catalyst surface during its use as a reductant in the reduction of sulfur dioxide.

The reduction of sulfur dioxide using a hydrocarbon reducing agent initiated at the elevated temperatures used in the prior art requires control of the maximum temperature reached during the reduction reaction and the use of special catalytic materials that can withstand prolonged exposure to these high temperatures without adversely affecting the activity of the catalyst. The use of these high reaction temperatures also requires consideration of the type of equipment and the materials of construction which may be employed since the sulfur dioxide reduction reaction is highly exothermic—corresponding to an adiabatic temperature rise in the reactor of from about 200° to about 750° F. depending on the strength of the $SO_2$ contained in the feed gas. Prior art process designs capitalize on the use of heat exchanging of a product gas with the feed gas to attain the required reaction initiation temperatures. However, this is not feasible because of materials of construction problems in the heat exchanger. In standard heat exchangers, the practical upper limit of heat exchanger temperature for product gases containing sulfur or other sulfur compounds in addition to $SO_2$ is generally in the range of about 1000° to 1200° F. Because of the higher temperatures needed to obviate the carbon deposition problem when certain higher hydrocarbons are used or are present in reducing agents, specially designed equipment would have to be employed to provide the supplemental heat necessary for a satisfactory reaction.

The gas flow configuration or method of introducing the feed gases in the reactor system used in U.S. Pat. Nos. 3,199,955; 3,927,191; 3,928,546 and 4,039,650 disclose the preheating of the $SO_2$ gas and gaseous reductant. In the first two mentioned patents the preheating is accomplished using varying types of heat exchange equipment, whereas in the latter two patents preheating is effected by subjecting the mixture of $SO_2$ and reductant to an up-flow regenerator or first reactor and subsequently reacting the mixture in the same vessel to effect reduction of a portion of the $SO_2$ to elemental sulfur and hydrogen sulfide, mixing this product gas stream with bypassed portions of $SO_2$ gas and reductant and then splitting the resulting gas mixture into two gas streams which are passed through second and third reactors operated in parallel to effect further reduction of the $SO_2$ to sulfur and hydrogen sulfide. Periodically, the flow in the first and third reactors is reversed to thereby subject these reactors to alternating heat absorbing and desorbing cycles, while flow in the second reactor is maintained in the same direction. The bypassed portions of $SO_2$ gas and reductant around the first reactor maintain the inlet gas temperatures to the second and third reactors within desired ranges. This type of reactor system flow configuration is called a "three vessel, reactor-regenerator system." In U.S. Pat. No. 3,199,955 processing schemes different from the three vessel, reactor-regenerator system are suggested.

When the hydrocarbon reducing agent is a higher hydrocarbon containing three or more carbon atoms or a natural gas containing concentrations of higher hydrocarbons, as disclosed hereinabove, the use of these processing systems presents some problems in the reduction of $SO_2$. One problem which has been observed is that carbonaceous deposits form on the surfaces of the catalyst used in the process. These deposits are believed to result from the cracking of the higher hydrocarbons in the reductant. In co-pending application Ser. No. 838,699, filed Oct. 3, 1977 a method is disclosed wherein carbon deposits on the catalyst surfaces are obviated by reacting the sulfur dioxide-containing gas and the hydrocarbon reducing agent at elevated temperatures in the presence of elemental sulfur vapors.

THE PRESENT INVENTION

The object of the present invention is to provide an improved process for reducing $SO_2$ to elemental sulfur which prevents carbon deposition on catalyst surfaces when using a gaseous reductant containing higher hydrocarbons. It has been found that carbon deposition on catalyst surfaces is prevented when the $SO_2$ gas stream and hydrocarbon reducing agent gas stream are preheated separately, as described in more detail hereinbelow, and then these preheated streams are rapidly mixed prior to their introduction into the reduction reactor. Initiation of the reduction reaction may be effected at temperatures of from about 700° to 1550° F., preferably 850° to 1500°, and carbon deposition is prevented from depositing on the catalyst surface. It has been found that by preheating the $SO_2$ gas stream to a temperature ranging from about 50° to 500° F., preferably 100° to 300° F., above the initiation temperature in the reaction zone and separately preheating the hydrocarbon reducing agent gas stream to a temperature ranging from about 100° to 800° F., preferably 300° to 500° F., below the initiation temperature in the reaction zone and then rapidly mixing these gas streams prior to their entry into the reaction zone, carbon deposition is prevented at initiation temperatures lower than 1700° F. The preheating of the $SO_2$ stream and reductant stream is adjusted so that when they are combined the mixture is at the desired inlet temperature to the reactor at which initiation of the reduction reaction is effected and carbon deposition on the catalyst surface is prevented. This process has been found most effective when employing a reactor system flow configuration comprising either a single reaction zone or multi-stage reactor system, such as a two-stage system operated in series wherein the gas in the system has unidirectional flow and operates in a steady-state system. However, this process is also applicable in a reversible flow, nonsteady-state system of a three vessel, reactor-regenerator system wherein carbon deposits form under similar reactor conditions. Preferably, elemental sulfur vapor is mixed with the hydrocarbon reducing agent gas stream. It has been found that the initiation temperature is further reduced when elemental sulfur vapor is used.

The present invention may be exemplified by utilizing either a single or two-stage reactor system. In a single-stage reactor system the $SO_2$-containing stream and the gas reductant stream are separately preheated, respectively above and below the initiation temperature in the reactor and, preferably, the gas reductant stream has added to it elemental sulfur vapor. The two streams are combined and then introduced into the reaction zone at a temperature sufficient to initiate the reduction reaction. A product stream containing elemental sulfur is recovered from the reaction zone.

In a two-stage reaction system, the invention comprises preheating separately the entire $SO_2$-containing gas stream to a temperature which is about 200° to 300° F. higher than the initiation temperature in the first reactor stage in the system, then preheating separately a first portion of the gaseous reductant, preferably mixed with elemental sulfur vapor, to a temperature of about 400° to 550° F. lower than the inlet temperature of the first reactor stage, rapidly mixing the resulting preheated streams prior to their introduction into the first reactor stage, such that the temperature of the resulting mixture is equal to the inlet temperature of the first reactor stage, passing the resulting mixture through the first reactor stage under reaction conditions sufficient to effect complete reaction of the first portion of gaseous reductant to produce a first product gas stream, mixing this product gas stream with the other portion of reductant which cools the product gas stream and passing the resulting mixture through the second reactor stage under reaction conditions sufficient to effect further reduction of $SO_2$ to a sulfur-containing product stream which contains no residual hydrocarbon reductant. The inlet gas temperature to the second reactor stage is maintained within desired ranges by the amount and temperature of the portion of gaseous reductant bypassing the first stage.

It has been found in using either the single- or two-stage reactor flow systems that in addition to the prevention of carbon deposits on catalyst surfaces the initiation of the reduction reaction can be achieved at lower temperatures than the minimum 1700° F. necessary to obviate the carbon deposition problem in the three vessel, reactor-regenerator system. A further discovery is that in the presence of minor amounts of elemental sulfur vapor added to the gaseous reductant or portion thereof prior to combining with the $SO_2$ gas stream, the initiation temperature of the reduction reaction can be further lowered without depositing carbon on the catalyst surfaces while the reaction proceeds smoothly to completion in a commercially acceptable manner with a moderate rise in the rate of temperature increase during the reaction to within acceptable limits.

The concentration of elemental sulfur vapor which preferably is present at the initiation of the reduction reaction of the $SO_2$ with the gaseous reductant should be in an amount sufficient to lower the initiation temperature of the reduction reaction while avoiding carbon deposition on the catalyst surfaces. Satisfactory operations have been found with concentrations of elemental sulfur vapor up to about 3 mol percent, expressed as $S_8$, of the process gas stream entering the reactor or the first reactor stage of a two-stage reactor system. The sulfur is present in the form of elemental sulfur vapor which may be produced by the process which is easily recycled and added to the hydrocarbon reductant prior to its introduction into the reaction system.

The product gas exiting from the reaction system which may contain elemental sulfur, hydrogen sulfide, unreacted $SO_2$ and other gaseous sulfur compounds such as carbonyl sulfide and carbon disulfide, as well as carbon dioxide and water vapor, should not be utilized to provide the elemental sulfur vapor because there is an appreciable increase in the volume of the feed gas mixture comprising the sulfur dioxide gas, hydrocarbon reducing gas and recycled product gas necessitating the installation of additional equipment for increasing the pressure of the recycled product gas. The larger volume of process gas to be handled by the reaction system not only requires an increase in equipment size, but also adversely affects the equilibrium or reaction efficiency due to the dilution effect. By separating the elemental sulfur product from the product gases and recycling the necessary amounts of sulfur, there is no appreciable increase in the volume of process gas necessitating any increase in equipment requirements.

In the operation of the present process, the temperatures which may be employed in the reduction of sulfur dioxide in the gas stream with a hydrocarbon reductant, preferably in the presence of elemental sulfur vapor, are within the range of about 700° to 2400° F., preferably 850° to 2000° F.

The catalytic material may typically be in the form of small spheres, pebbles, pellets or granules and any of the well-known catalysts previously employed for the reduction of sulfur dioxide may be used, such as bauxite, alumina, silica, calcium sulfide, calcium aluminate and combinations thereof.

In the present process any hydrocarbon which under the reaction conditions is in a gaseous state and which would normally form carbonaceous deposits on the catalyst surface under the reaction conditions employed in the absence of practicing the present invention may be used. The present invention has found particular applicability to reduction reactions which employ higher hydrocarbons of at least 3 carbon atoms, preferably from 3 to 8 carbon atoms. However, as noted above, other gaseous reductants, e.g. natural gas, containing amounts of higher molecular weight hydrocarbons which under the reaction conditions employed result in carbon deposits can be used.

The sulfur dioxide which is reduced in the present process may be essentially pure or it may comprise a small percent of the gas treated, as in an industrial waste gas, wherein the sulfur dioxide content may vary from less than 1% up to 100% with the other components comprising essentially oxygen, nitrogen, carbon dioxide, $SO_3$ and water vapor. In general, smelter gases contain approximately 2 to 16% by volume sulfur dioxide and can be conventionally handled in the process of the present invention. However, emissions from utility stack gases generally containing less than 1% and more likely less than about ½ of 1% by volume sulfur dioxide, should be recovered by any of the well-known sulfur dioxide recovery processes wherein the sulfur dioxide emissions are recovered in the form of a more concentrated gas, generally in excess of about 10% sulfur dioxide by volume and may range upward in $SO_2$ concentrations to 100% by volume, dry basis. Any of the commercially available sulfur dioxide recovery processes may be used to upgrade the sulfur dioxide content in the flue gas to be treated, e.g. the so-called "regenerative alkali", "regenerative solid adsorption" and "regenerative organic" processes.

Contact time of the process gas in the reaction system may vary from about 0.1 to 7 seconds, preferably about 0.25 tc 5 seconds.

The reduction of sulfur dioxide employing a hydrocarbon reducing agent is carried out to achieve maximum conversion using an amount of reducing gas sufficient to convert the major part of $SO_2$ to sulfur and hydrogen sulfide and other sulfur-containing gases and preferably obtain a molar ratio of hydrogen sulfide to residual $SO_2$ of about 2:1 in the product gas stream exiting from the reactor system. The theoretical or stoichiometric molar ratio of $SO_2$ to reducing gas in the process feed stream to effect optimum conversion of $SO_2$ to elemental sulfur is equivalent to the number of carbon atoms plus one-fourth of the total hydrogen atoms in the reductant molecular formula. Thus, for each reductant the ratio may be determined from the following formula:

$$\left(\frac{\text{No. of Hydrogen Atoms in Reductant}}{4}\right).$$

Preferably, it is desired to use up to about 30% excess of reducing agent to insure obtaining the desired 2:1 molar ratio of $H_2S:SO_2$ in the product gas. Accordingly, the stoichiometric molar ratio of reactants (sulfur dioxide:reducing gas) in the process gas for hydrocarbons of 3 to 8 carbon atoms should be from 3.33:1 up to about 12.5:1, depending upon the reducing gas employed. For instance, for a natural gas which is mainly methane containing either 15 mol% propane or 10 mol% butane, a ratio of 1.63:1 to 2.45:1; if propane is used as the reducing gas, the ratio of $SO_2$ to propane is 3.33:1 to 5:1, for butane a ratio of 4.33:1 to 6.5:1; and if the reducing agent is octane, a ratio of 8.33:1 to 12.5:1.

The molar ratio of reactants should be optimized so that under the operating conditions, maximum conversion is achieved thereby giving maximum utilization of the hydrocarbon reducing gas and only small amounts of by-product carbon monoxide and hydrogen appear in the exit gases. Furthermore, optimization of the ratio of reactants assists in maintaining in the product gas only trace amounts of carbonyl sulfide and carbon disulfide thereby avoiding the need for a separate reaction vessel to react these components prior to introducing the product gas into a conventional Claus system for converting the hydrogen sulfide in the product gas to additional sulfur by reaction with the residual $SO_2$ from the reduction system. Product gases leaving the reduction system pass through a sulfur condenser from which elemental sulfur may be obtained, and then into a conventional Claus system wherein the hydrogen sulfide formed in the reduction reaction, reacts with residual sulfur dioxide in the product stream to produce additional amounts of elemental sulfur.

As noted above, in order to provide the necessary amount of elemental sulfur vapor in the reduction reaction, the sulfur product is condensed and the desired amount of sulfur vaporized and recycled to the feed stream for utilization in the reduction reaction.

As earlier mentioned, the flow configuration of the reactor system which may be employed in the reduction of $SO_2$ in the present invention may be one of those used in the previous inventions, namely U.S. Pat. Nos. 3,199,955; 3,928,547 and 4,039,650, or in a single stage or straight through reactor system when propane is the reductant and in a multi-stage reactor system wherein the reactors are in series when the gaseous reductant is butane or contains a substantial amount of butane. Preferably, elemental sulfur vapor is added to the reductant going to the first stage reactor. Satisfactory results have been achieved in a two stage reactor system when from about 25% to 75%, preferably from about 33% to 50% of the reductant is introduced in the first stage and the remaining portion of the reductant is mixed with the product gas from the first stage and passed into the second stage.

In order to better understand the operation of the present process, the following examples are offered:

EXAMPLES 1-4

A series of runs was conducted in a tubular type reactor comprising a straight 2" diameter Vycor tube, packed with a fixed bed of catalyst, and set vertically in a furnace. The furnace was a Lindberg furnace with three independently controlled heating elements. The reactor was packed with a 12" bed of ¼" to ⅜" diameter calcium aluminate catalyst spheres supported in the middle portion of the tube between the center and bottom heating elements. In this type of reactor set-up, no provision was made for bypassing the reactants or portion thereof into the intermediate section of the reactor. The catalyst was preconditioned by calcining overnight at 1800° F. in an air atmosphere. Void space of the catalyst bed was about 50%. In this series of runs the hydrocarbon reducing agent used was normal butane and the gas flow into the reactor was downward. The feed gas comprising a mixture of sulfur dioxide, butane and water were premixed in the main feed line and preheated together in the empty space of the reactor above the catalyst bed. The molar ratio of $SO_2$ to butane used was 6.5:1. The water component of the feed gas was obtained by passing the sulfur dioxide component through a water saturator maintained at a temperature commensurate with the desired partial pressure. Temperatures in the reactor were measured by a movable thermocouple inserted into a central Vycor thermowell, vertically transversing the entire packed section of the reactor. An isothermal temperature profile in the catalyst bed was attempted to be maintained during each run.

In this first set of runs, the immediate objective was to determine the minimum reaction temperature at which no carbonaceous deposits formed on the catalyst surface. Contact time of the reactants in the catalyst bed was 0.5 second and the reactor temperatures used were 1500°, 1600°, 1700° and 1800° F. The process gases used were both strong (12% normal butane and 78% sulfur dioxide) and diluted (4% normal butane and 26% sulfur dioxide). The feed was diluted by mixing with nitrogen to reduce the reactant concentration to ⅓ of the strong gas concentration. These runs demonstrated that with normal butane as the reductant, no carbonaceous deposits were noticed on the catalyst surface at temperatures of 1700° and 1800° F. At 1600° F. a black carbonaceous coating on the reactor in the top 3" of the catalyst bed was observed and at 1500° F. black deposits were observed in the top 5" of the bed mainly at or near the reactor wall. The catalyst spheres in this region were coated with gray deposits. These runs indicated that even though normal butane was completely reacted at lower temperatures, a minimum reactor temperature of 1700° F. was required to prevent carbon from depositing on the catalyst surfaces. Below 1700° F. the cracking of the normal butane to carbon and other by-products occurred simultaneously with the reaction of the normal butane with sulfur dioxide, but at these lower temperatures the carbon formed remained unreacted. Thus, in having an inlet temperature of 1700° F. it would be expected that the temperatures in the reactor would rise to undesirable levels.

EXAMPLES 5 and 6

In Example 5 a series of runs was conducted in which propane gas was used as reductant, while in Example 6 butane was the reductant. The reactor used was a 2" diameter Vycor glass tube set vertically in a furnace. The furnace was a Lindberg furnace with three independently controlled heating elements. The reactor tube was divided into an upper and lower chamber. Inlet means were provided in the intermediate section of the reactor for the introduction of the hydrocarbon reductant into the system. The inlet means comprising a side arm, joined the vertical reaction chamber at a 2" mixing zone or space between the top and bottom chambers. The mixing zone was constricted to an internal diameter of about ½". The side arm had separate heating means associated with it to preheat the reductant. The upper chamber of the reactor which served as a separate $SO_2$ preheater, was packed with a 10" bed of Vycor glass chips. The lower chamber was packed with a 11" bed of ¼" to ⅜" diameter calcium aluminate catalyst spheres. In the mixing zone portion of the reactor, wherein the separately preheated $SO_2$ and reductant feed streams were rapidly mixed before entering the reactor, crushed calcium aluminate catalytic particles with screen size of $-4+8$ mesh were utilized. The void space in the bottom catalyst bed was about 50%. The molar ratios of $SO_2$ to propane and $SO_2$ to butane used were 5.0:1 and 6.5:1, respectively. The water component of the feed gas was obtained by passing the $SO_2$ stream through a water saturator maintained at a temperature commensurate with the desired partial pressure. The $SO_2$ stream was preheated to a temperature of about 250° F. above the inlet temperatures shown below and the propane stream was preheated to a temperature of about 500° F. below the inlet temperatures shown below. When mixed, the temperature of the combined feed equalled the inlet temperature. The composition of the combined feed entering the reactor in Examples 5 and 6, flow rates of feed components and observations as to whether carbon was deposited are presented in the following tables.

| Component | Example 5 Volume % | Flow Rates* |
|---|---|---|
| $SO_2$ | 64.6 | 5366 ml/min. |
| $C_3H_8$ | 12.9 | 1072**ml/min. |
| $H_2O$ | 6.6 | 548 ml/min. |
| $N_2$ | 15.9 | 1321 ml/min. |

*Measured at 70° F. and 1 atmosphere pressure.
**Introduced through the preheated side arm inlet into the intermediate portion of the reactor.

| Component | Example 6 Volume % | Flow Rates* |
|---|---|---|
| $SO_2$ | 64.61 | 5366 ml/min. |
| $C_4H_{10}$ | 9.94 | 826**ml/min. |
| $H_2O$ | 6.60 | 548 ml/min. |
| $N_2$ | 18.85 | 1566 ml/min. |

*Measured at 70° F. and 1 atmosphere pressure.
**Introduced through the preheated side arm inlet into the intermediate portion of the reactor.

Results of Examples 5 & 6

| Example | Reaction Conditions: Inlet Temp., °F. | Reaction Conditions: Contact Time, Sec. | Observations of Catalyst Surface |
|---|---|---|---|
| 5 | 1200 | 0.5 | Carbon Formed |
| 5 | 1300 | 1.0 | " |
| 5 | 1350 | 0.5 | No Carbon Formed |
| 5 | 1350 | 1.0 | " |
| 5 | 1400 | 0.5 | " |
| 5 | 1400 | 1.0 | " |
| 5 | 1500 | 0.5 | " |
| 5 | 1500 | 1.0 | " |
| 6 | 1250 | 0.5 | Carbon Formed |
| 6 | 1300 | 0.5 | " |
| 6 | 1400 | 0.5 | " |
| 6 | 1500 | 0.5 | No Carbon Formed |

From the results of Examples 5 and 6 it may be seen that inlet temperatures of about 1350° F. for propane and about 1500° F. for butane are sufficient to prevent carbon deposition on the catalyst surfaces when using the method of the present invention.

EXAMPLE 7

The reactor system used in this example was basically the same as that used in Examples 5 and 6, except in the type of catalyst used. The upper chamber of the reactor tube which served as a separate $SO_2$ preheater was packed with a 10" bed of Vycor glass chips. The reactor portion was packed with an 11" bed of ⅜" diameter activated alumina catalyst spheres. In this example propane gas was used as the reductant and elemental sulfur vapor was added to the preheated reductant stream through the reactor side arm.

The elemental sulfur vapor was prepared by passing a mixture of $SO_2$ and carbon disulfide ($CS_2$) gases through a catalyst bed of activated alumina maintained at a temperature of about 1100° F. whereby the $SO_2$ and $CS_2$ reacted to form a product gas stream comprising $CO_2$ and elemental sulfur vapor. The propane and $SO_2$ streams were separately preheated as in Example 5. The hot gas stream of sulfur vapor (and $CO_2$) was then mixed with the preheated propane stream which in turn was then rapidly combined with the preheated $SO_2$ stream at the feed mixing chamber of the reactor. The resulting temperature of the combined feed mixture was the same as the inlet temperature to the reactor. The feed mixture was then passed through the reactor to effect the reduction of $SO_2$ to a sulfur-containing product stream containing no residual hydrocarbon reductant. The reactor inlet temperature was maintained at 1250° F. and the contact time was 0.5 second.

Flow rates of components, composition of the combined feed, analysis of the product gas from the reactor and observation as to whether carbon was deposited on the catalyst surfaces are presented in the following tables.

| Component | Combined Feed Composition ml/min | Vol. % |
|---|---|---|
| $SO_2$ | 4499 | 54.41 |
| $C_3H_8$ | 900 | 10.88 |
| $H_2O$ | 500 | 6.05 |
| $N_2$ | 1401 | 16.94 |
| $CO_2$ | 705 | 8.52 |
| $S_8$ | 257 | 3.11 |

| Component | Product Gas Composition (Dry & Sulfur-Free Basis) Volume % |
|---|---|
| $SO_2$ | 9.29 |
| $C_3H_8$ | 0 |
| $H_2O$ | — |
| $N_2$ | 22.84 |
| $CO_2$ | 49.95 |
| $S_8$ | — |
| $H_2S$ | 10.66 |
| $H_2$ | 2.75 |
| COS | 0.51 |
| CO | 3.99 |
| $CS_2$ | 0.01 |

From a comparison of Examples 5 and 7 it may be seen that when propane is the reductant and elemental sulfur vapor is present at initiation of the reduction reaction, the initiation temperature is decreased by an additional 100° F., i.e. from 1350° F. (Example 5) to 1250° F. (Example 7) and carbon formation on the catalyst is prevented.

What is claimed is:

1. A process for preventing carbonaceous deposits on catalytic surfaces during the catalytic reduction of gaseous sulfur dioxide to elemental sulfur at temperatures from about 700° to 2400° F. with a hydrocarbon reducing agent which normally would form said carbonaceous deposits on the catalyst surface under the reaction conditions employed wherein said reduction reaction is effected at an initiation temperature from about 700° to 1550° F. comprising the steps of:

(a) preheating separately the $SO_2$ gas stream to a temperature of about 50° to 500° F. above said initiation temperature, preheating separately a first portion of the reductant to a temperature of about 100° to 800° F. below said initiation temperature, (b) mixing the two preheated streams just prior to their entry into a reaction zone; and (c) passing the resulting mixture into said reaction zone under reaction conditions including a temperature sufficient to initiate reaction of the reductant with the $SO_2$ feed to produce a product gas stream containing elemental sulfur product.

2. The process in claim 1 wherein the reaction system comprises a single stage reactor containing one distinct reaction zone.

3. The process of claim 1 wherein the reduction is effected in a multi-stage reaction system.

4. The process of claim 1 wherein the reaction system comprises two distinct reaction zones operated in series.

5. The process of claim 1 wherein elemental sulfur vapor is present during the initiation of the reduction reaction.

6. The process of claim 5 wherein the elemental sulfur is present in amounts up to about 3 mol percent, expressed as $S_8$.

7. The process of claim 3 wherein from 25% to 75% of the reductant is fed to the first reaction zone of the reactor system and the remaining portion of said reductant is added to the second reaction zone of the reactor system.

8. The process of claim 1 wherein the hydrocarbon reducing agent contains 3 to 8 carbon atoms per molecule.

9. The process of claim 1 wherein the reducing agent is propane.

10. The process of claim 1 wherein the reducing agent is butane.

11. The process of claim 1 wherein the reducing agent is a natural gas which contains higher molecular weight hydrocarbons in concentrations sufficient to form carbonaceous deposits on the catalyst surface under the reaction conditions employed.

12. The process of claim 11 wherein the reducing agent is a natural gas containing in excess of about 10 mol percent propane.

13. The process of claim 11 wherein the reducing agent is a natural gas containing in excess of about 7 mol percent butane.

14. The process of claim 11 wherein the reducing agent is a natural gas containing in excess of about 0.25 mol percent of at least one hydrocarbon selected from the group consisting of pentane and hexane, heptane and octane.

15. The process of claim 1 wherein the reduction reaction is effected at temperatures within the range of about 850° to 2000° F.

* * * * *